United States Patent [19]
Ko

[11] Patent Number: 6,004,415
[45] Date of Patent: Dec. 21, 1999

[54] MANUFACTURE PROCEDURE OF VEHICLE SUNSHADE CURTAIN

[76] Inventor: Chung-Chieh Ko, No. 427, Chien Hsing Rd., Taichung, Taiwan

[21] Appl. No.: 08/902,259

[22] Filed: Jul. 29, 1997

[51] Int. Cl.[6] ...................................................... B32B 31/14
[52] U.S. Cl. .......................... 156/150; 156/163; 156/196; 160/370.22
[58] Field of Search .............................. 156/150, 84, 160, 156/163, 196; 160/370.22

[56] References Cited

U.S. PATENT DOCUMENTS

| | | | |
|---|---|---|---|
| 1,621,672 | 3/1927 | Darby | 160/370.22 X |
| 2,561,188 | 7/1951 | Ferguson | 160/370.22 X |
| 2,594,386 | 4/1952 | Blessen | 160/370.22 X |
| 3,410,601 | 11/1968 | Thompson | 160/370.22 X |
| 4,848,437 | 7/1989 | Laniado et al. | 160/370.22 |
| 5,443,923 | 8/1995 | Laniado et al. | 156/299 X |
| 5,564,770 | 10/1996 | Smith et al. | 160/370.22 X |

*Primary Examiner*—Francis J. Lorin
*Attorney, Agent, or Firm*—Bacon & Thomas

[57] ABSTRACT

The present invention relates to a manufacture procedure of vehicle sunshade curtain including:

A. Two PET (polyethylene terephthalate) sheets in different thickness are used;
B. Both sides of the interior and exterior films are electroplated;
C. The interior and exterior films are glued together by a melted PE material constituting an inceptive sunshade curtain;
D. The inceptive sunshade curtain is folded in two by facing the interior film inside and then curled up from the folding end; and
E. The curled inceptive sunshade curtain is heated 40 minutes at about 110° C. to shrink the interior and exterior films. After quick cooling down, the inceptive sunshade curtain is set to a curled finished sunshade curtain.

The present invention is to simplify the vehicle sunshade curtain manufacture procedure, lower the manufacture cost, increase the production speed and enhance the sunlight reflecting feature.

6 Claims, 5 Drawing Sheets

A. Two PET (polyethylene terephthalate) sheets in different thickness are used as the interior and exterior films;

B. Both sides of the interior and exterior films are electroplated;

C. The interior and exterior films are glued together by a melted PE material constituting an inceptive sunshade curtain;

D. The inceptive sunshade curtain is folded in two by facing the interior film inside and then curled up from the folding end;

E. The curled inceptive sunshade curtain is heated 40 minutes at about 110°C to shrink the interior and exterior films. After quick cooling down, the inceptive sunshade curtain is set to a curled finished sunshade curtain.

FIG. 2

MANUFACTURE PROCEDURE OF VEHICLE SUNSHADE CURTAIN

BACKGROUND OF THE INVENTION

The present invention relates to a manufacture procedure of vehicle sunshade curtain. To avoid the temperature rising inside a vehicle parked in a long period of time, drivers always put sunlight reflecting device on the window glass, such as sun screen and sunshade curtain. The side window is small in area so that the opening and closing of the sunlight reflecting device is of no trouble. On the contrary, the windshield is large in area so that drivers have difficulty in opening and closing the regular sunlight reflecting device. Therefore, how to improve the installation of the sunlight reflecting device on the windshield should be an important issue to do more research and development.

The prior art of vehicle sunshade curtain as shown in FIG. 1 includes a roller rod controlled by a roller spring and a curtain made of paper or fabric is curled up on the roller rod. There is a fixing rod installed on the other end to the roller rod of the curtain wherein two suckers are installed. On the windshield, the roller rod and a fixing hook are respectively fixed on the two sides. The sunshade curtain is then opened by putting a ring in the fixing hook.

The prior sunshade curtain has several drawbacks in manufacturing and using. After the sunshade curtain is closed and curled up, the sunshade curtain is always left on the windshield instead of taking down. Although the size of a closed and curled-up sunshade curtain is not big, the long rod shape left on the windshield will indeed obstruct drivers' view and affect drivers' safety. Therefore, the unused sunshade curtain should be taken down from the windshield.

The prior sunshade curtain is not easily manufactured. It needs a hollow roller rod and control brackets to install the roller spring on the roller rod. The curtain is curled up and fixed on the roller rod. There are also two suckers installed on the fixing rod and one ring on the other end of the curtain. It is apparent that there are large number components needed to be assembled. Furthermore, the material like fabric or paper having a lot of pin holes does not reflect sunlight effectively.

SUMMARY OF THE INVENTION

The primary object of the present invention is to provide a manufacture procedure of vehicle sunshade curtain. It is simple in manufacture to improve the prior sunshade curtain respect to the drawback of difficult assembling large numbered components. It is also new that two electroplated PET films are folded in two and curled up undergoing a thermal treatment to provide an effective sunlight reflecting device. Also, the production speed can be increased and consequently the manufacture cost is lower.

The second object of the present invention is to provide a manufacture procedure of vehicle sunshade curtain wherein the sunshade curtain is wrinkle free while it is opened and will be automatically curled up toward the centerline to close. It is easy to store and space-saved. Also, there is no hard component to enhance the safety.

BRIEF DESCRIPTION OF THE DRAWINGS

The above and other objects, features and advantages of the present invention will become apparent from the following description with the reference to the accompanying drawings, in which:

FIG. 2 is a flow chart of the manufacture procedure of vehicle sunshade curtain according to the present invention;

DESCRIPTION OF THE PREFERRED EMBODIMENT

Figure 1:
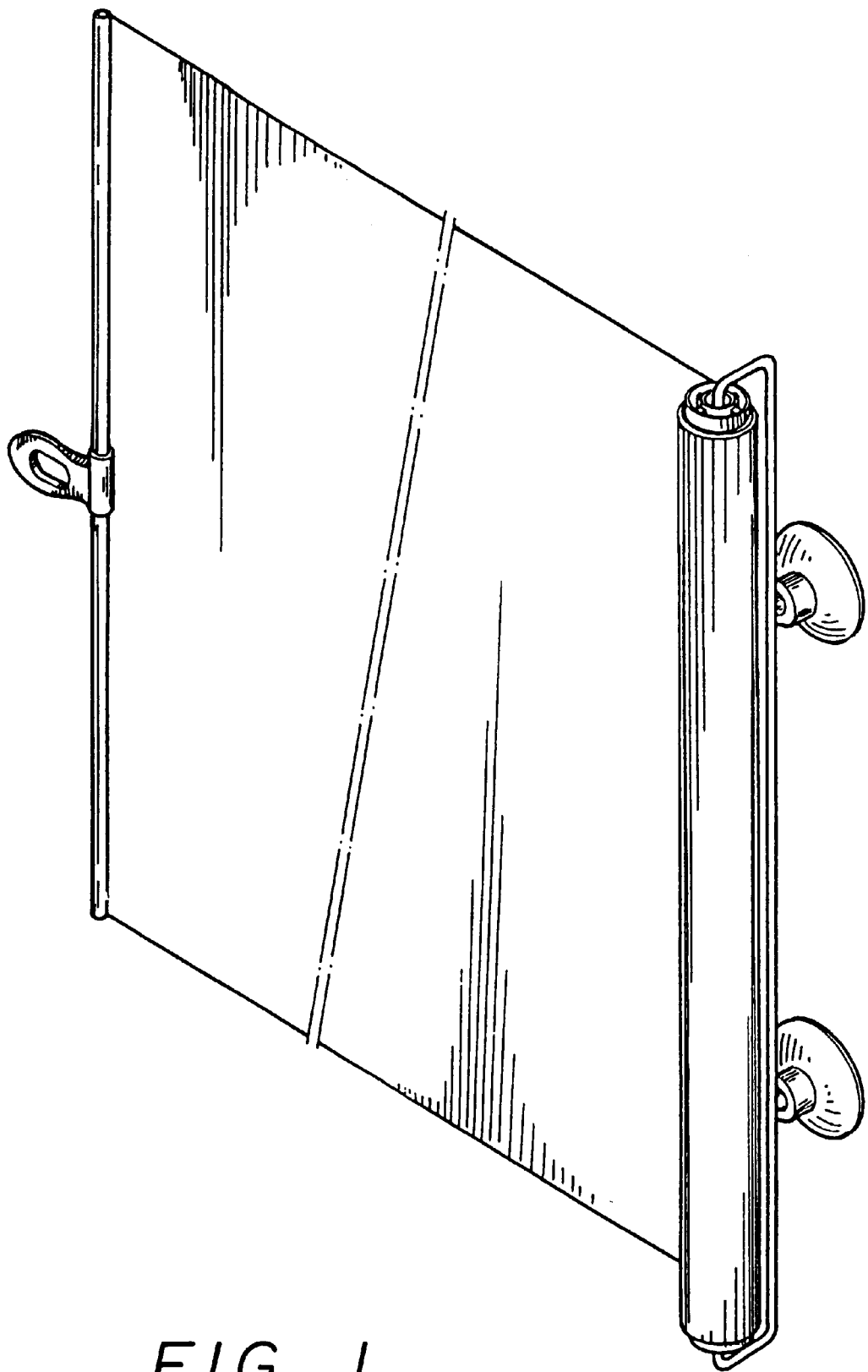
FIG. 1 is a perspective view of the prior art of vehicle sunshade curtain.
Figure 3:
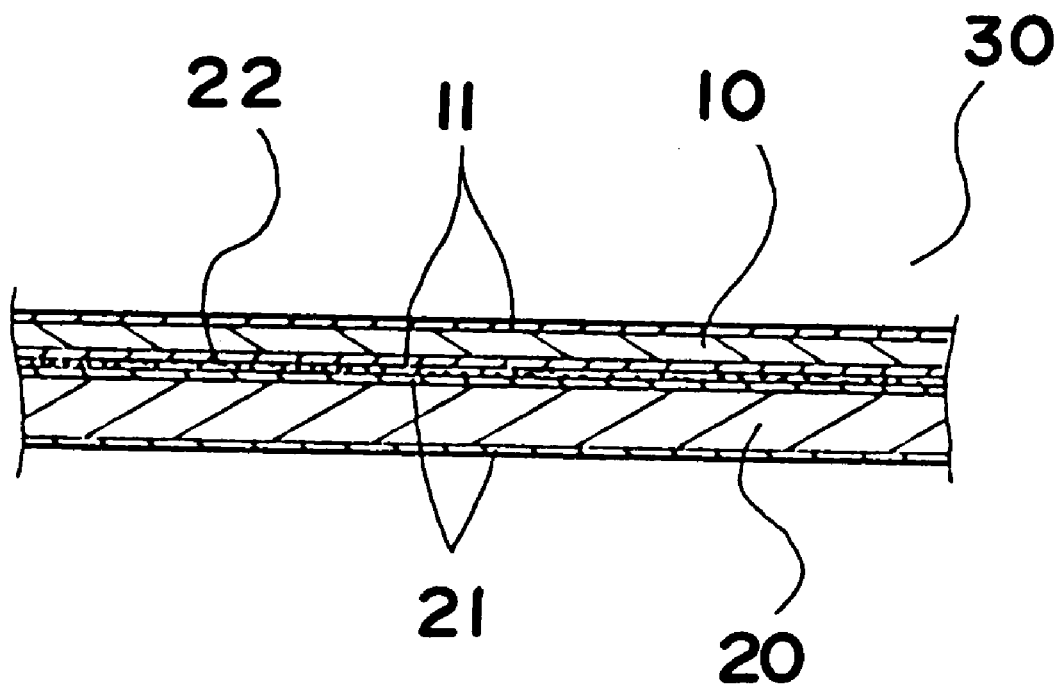
FIG. 3 is a partial sectioned view of the interior film glued with the exterior film.
Figure 4:
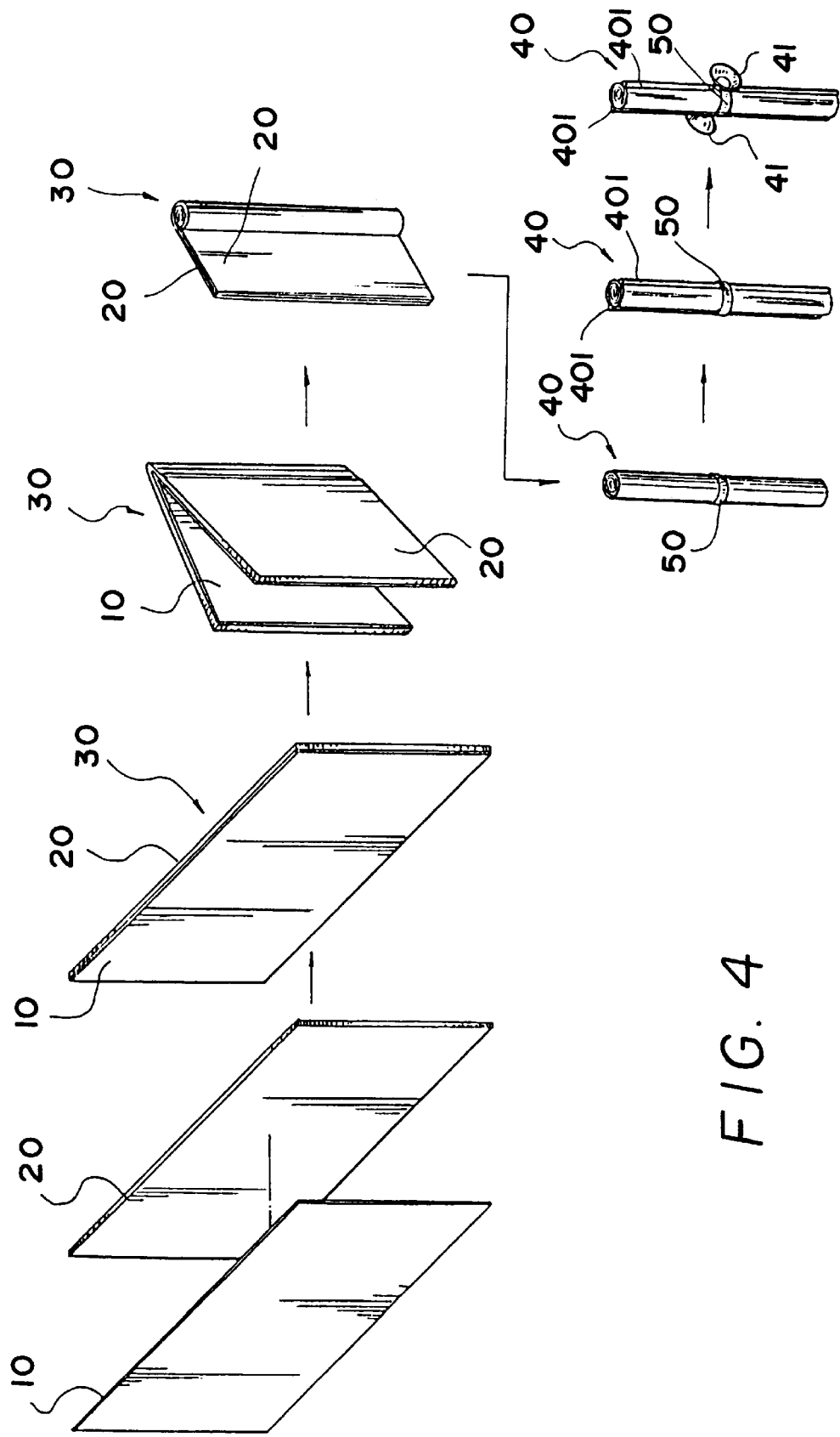
FIG. 4 is a perspective view showing the thermal treatment procedure of the vehicle sunshade curtain.

Referring to FIGS. 2 to 5, the present invention relates to a manufacture procedure of vehicle sunshade curtain including:

A. Two PET (polyethylene terephthalate) sheets in different thickness are used wherein the thickness ratio of the interior film 10 to the exterior film 20 is 0.012 mm: 0.05 mm or 0.015 mm: 0.075 mm;

B. Both sides of the interior 10 and exterior 20 films are electroplated as shown in FIG. 3 numbered by 11, 21.

C. The interior and exterior films 10, 20 are glued together by a melted PE (polyethylene) material constituting an inceptive sunshade curtain 30.

D. The inceptive sunshade curtain 30 is folded in two by facing the interior film 10 inside, then curled up from the folding end and fixed by adhesive thermal tapes 50.

E. The curled inceptive sunshade curtain 30 is heated 40 minutes at about 110° C. to shrink the interior and exterior films 10, 20. After quick cooling down, the inceptive sunshade curtain 30 is set to a curled finished sunshade curtain 40.

F. Both open ends of the sunshade curtain 40 are slightly curled up to form curled ends 401 wherein suckers 41 are installed.

Figure 5:
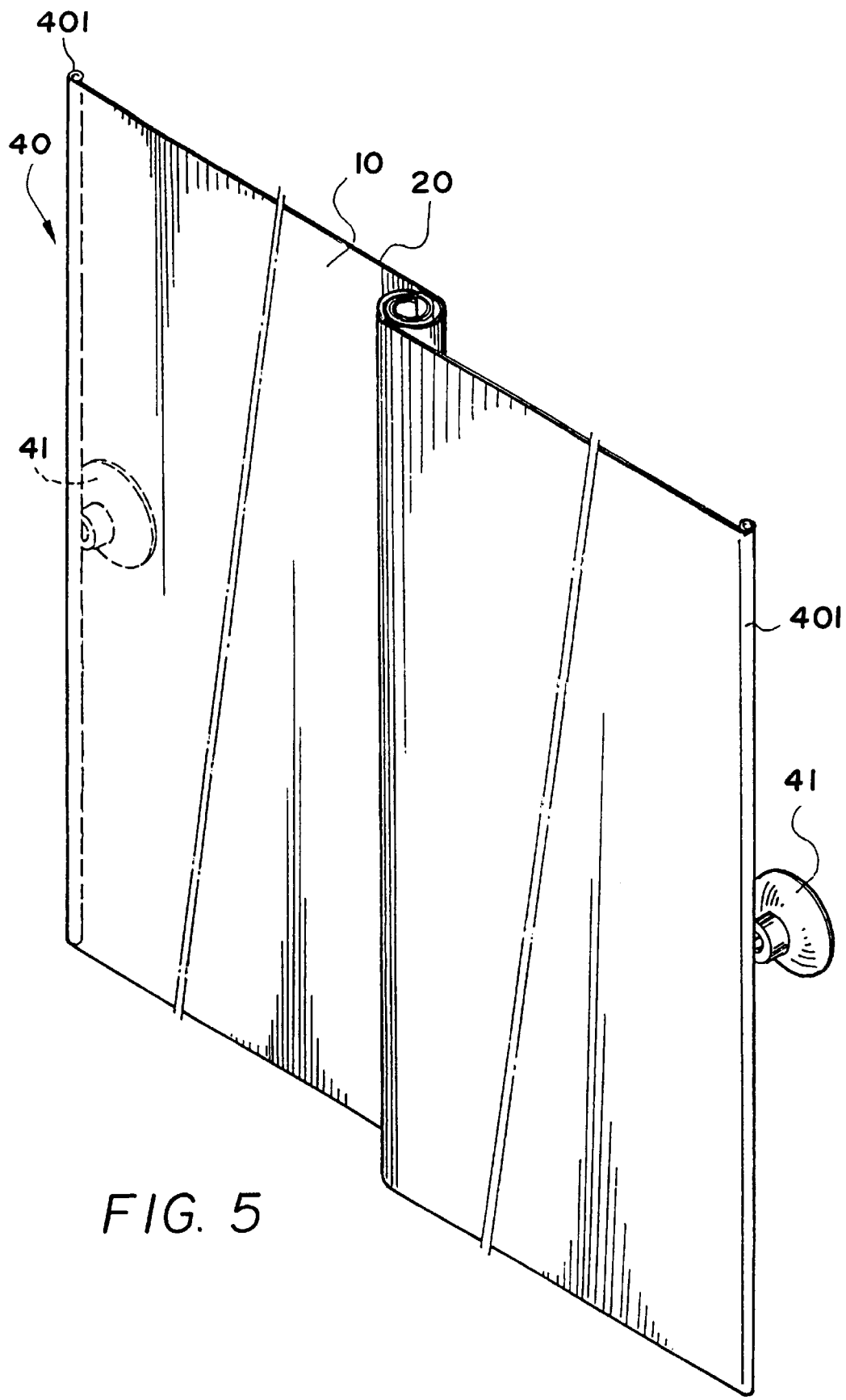
FIG. 5 is a perspective view showing the operation of the vehicle sunshade curtain.

The sunshade curtain made by the present manufacture procedure is folded and curled when not in use. The retracting force of the exterior film 20 is always stronger than that of the interior film 10, since the interior film 10 is thinner than the exterior film 20 and both films made of PET material have been done the thermal treatment. Also, the retracting force is proportional to the temperature. When the sunshade is opened, the curtain is fixed and expanded on the windshield by the suckers 41 as seen in FIG. 5. The interior film 10 is faced the interior of vehicle and the exterior film 20 does the exterior. According to the present invention, the sunshade curtain 40 is always wider than the windshield so that the center portion of the sunshade curtain 40 is still curled and not fully expanded so that the curled central portion will reinforce the central portion structure and provide a retracting force accompanied by the suckers 41 to flatten the sunshade curtain 40 during opening. Both sides of the sunshade curtain 40 are electroplated so that the sunlight will be reflected effectively. Also, the temperature of the sunshade curtain 40 rises up due to the sunlight incident upon the sunshade curtain 40 so that the retracting force becomes stronger. To take down the sunshade curtain 40, the suckers 41 are first removed from the windshield and the sunshade curtain 40 is automatically curled up due to the retracting force by the interior and exterior films 10, 20.

From the foregoing it is apparent that the present invention has the following advantages:

1. The present vehicle sunshade curtain is simple to manufacture and improve the prior sunshade curtain respect to the drawback of difficult assembling large numbered components.

2. Both sides of the PET films are electroplate in the early manufacture stage to enhance shining of the sunshade curtain and reflect the sunlight effectively.

3. The sunshade curtain is set by thermal treating the PET interior and exterior films in different thickness together so that the retracting force of the exterior film is stronger than that of the interior film. Since the retracting force is proportional to the temperature, the sunshade curtain is wrinkle free while opening and will be automatically curled up to close.

4. The present sunshade curtain has features of easy storage and space-saving. Furthermore, it is safe to store inside the vehicle, since there are no hard components such as fixing rods and roller rod.

5. To close the prior vehicle sunshade curtain, users have to take down the sunshade curtain from the windshield and curl up from one end to the other end. The present sunshade curtain is easy to close, since the curtain is automatically curled up toward the center after removing the suckers.

I claim:

1. A manufacture procedure for a vehicle sunshade curtain comprising:
   i) electroplating both sides of a first and a second polyethylene terephthalate sheet having different thickness;
   ii) gluing one side of said first electroplated sheet to one side of said second electroplated sheet to form an inceptive sunshade curtain;
   iii) folding said glued sunshade curtain in half so that surface of said first sheet contacts itself and a fold is formed;
   iv) rolling said folded curtain on itself from the folded end to form a cylindrical roll with the folded end in the center of said roll and an open end on the periphery of the roll; and
   v) heating said roll to a sufficient temperature for a sufficient time to set a curl in the rolled curtain.

2. A manufacture procedure of vehicle sunshade curtain according to claim 1, wherein the thickness ratio of said first film to said second film is 0.012 mm:0.05 mm.

3. A manufacture procedure of vehicle sunshade curtain according to claim 1, wherein the thickness ratio of said first film to said second film is 0.015mm:0.075 mm.

4. A manufacture procedure of vehicle sunshade curtain according to claim 1, wherein the open end of said sunshade curtain is slightly curled.

5. A manufacture procedure of vehicle sunshade curtain according to claim 1, wherein there is a suction member installed on each open end of said sunshade curtain.

6. A manufacture procedure for a vehicle sunshade according to claim 1, wherein the rolled curtain is heated for forty minutes at a temperature of 110° C. to shrink said first and second films and then the heated roll is quickly cooled to set the curl in the rolled curtain.

\* \* \* \* \*